United States Patent

Goedtke et al.

[11] Patent Number: 5,380,475
[45] Date of Patent: Jan. 10, 1995

[54] PROCESS FOR MANUFACTURING AN OXIDATION-STABLE COMPONENT ON A CFC BASE, PARTICULARLY FOR SPACE TRAVEL

[75] Inventors: Peter Goedtke; Ernst Blenninger; Manfred Lechner, all of München; Ulrich Papenburg, Burgdorf; Peter Sindlhauser, Probstried; Ulrich Goetz, Buching, all of Germany

[73] Assignee: Deutsche Aerospace, Germany

[21] Appl. No.: 973,376

[22] Filed: Nov. 9, 1992

[30] Foreign Application Priority Data

Nov. 9, 1991 [DE] Germany .................. 4136880

[51] Int. Cl.⁶ .................. C04B 35/52; C08K 7/06
[52] U.S. Cl. .................. 264/29.5; 264/60; 264/162; 423/447.2; 427/228; 427/249; 427/250; 428/408
[58] Field of Search .................. 264/29.1, 60, 29.5, 264/29.6, 162; 423/447.4, 447.6, 447.7, 447.2; 428/408; 427/228, 249, 250

[56] References Cited

U.S. PATENT DOCUMENTS

| | | | |
|---|---|---|---|
| 4,029,844 | 6/1977 | Olcott | 264/29.6 |
| 4,201,611 | 5/1980 | Stover | 264/29.5 |
| 4,508,762 | 4/1985 | Rousseau | 264/29.5 |
| 4,514,346 | 4/1985 | Luhleich et al. | 264/29.5 |

FOREIGN PATENT DOCUMENTS 2834315 3/1979 Germany .................. 264/29.6

Primary Examiner—Mathieu D. Vargot
Attorney, Agent, or Firm—Evenson, McKeown, Edwards & Lenahan

[57] ABSTRACT

For the manufacturing of an oxidation-stable component that can withstand temperature changes for space travel, a solid CFC-body with a density of from 0.1 to 0.8 g/cm³, which has nondirectional short fibers, is made from short carbon fibers and a hardenable resin binder. From the solid CFC-body, a CFC-blank having the dimensions of the component to be manufactured is prepared by means of turning or other material cutting. The CFC-blank is infiltrated with pyrolytic carbon to a density of no more than 1.0 g/cm³ and then with metallic silicon so that its density amounts to more than 2.0 g/cm³. A portion of the metallic silicon is reacted with the pyrolytic carbon to form silicon carbide. The proportion of the unreacted metallic silicon which remains in the component after this reaction amounts to at least 15 percent by weight.

19 Claims, 1 Drawing Sheet

PROCESS FOR MANUFACTURING AN OXIDATION-STABLE COMPONENT ON A CFC BASE, PARTICULARLY FOR SPACE TRAVEL

BACKGROUND AND SUMMARY OF THE INVENTION

This invention relates to a process for manufacturing oxidation-stable components, particularly hollow bodies, on a CFC-base, particularly adapted for space travel.

Certain components of rocket engines, satellites, probes, space stations and space tugs are subjected to extreme stress caused by temperature changes, and to oxidative and abrasive corrosion. For example, in the case of control nozzles and thrust nozzles of rocket engines, temperature fluctuations of 2,000° C. and more occur within milliseconds. Since the fuels of such an engine generally contain an oxidizing agent, nozzles are also subjected to extreme stress caused by oxidation. Because the combustion gas of solid propellants contains mostly solid particles such as boric or aluminum particles, which usually leave the nozzle at several times the speed of sound, nozzles are also subjected to considerable abrasive wear. Thus, extremely high demands are made on the surface quality of such nozzles, especially because surface quality has a considerable influence on the development of the gas flow (laminar or turbulent flow). Also, certain power units, such as the vernier engines for orbit control of satellites, have an operating capability of 10 years and more, and thus must withstand the mentioned stresses for an extremely long time without any damage.

Certain rocket engines, such as that of the "Ariane V", are ignited by solid-propellant charges. For this purpose, the hot combustion gas of the solid-propellant charge is fed to the rocket engine by way of a gas conducting manifold, which is subjected to a temperature of far above 2,000° for several seconds. Since the solid propellant contains oxidizers, and the hot combustion gases again contain solid particles as noted above, the manifold is also subjected to enormous stress caused by oxidation, and to high wear.

For nozzles and combustion chambers of power units for satellite orbit control, currently alloys on a platinum rhodium base are used in most cases. However, not only are these alloys extremely expensive; since they can be exposed to a gas temperature of no more than 1,300° C., they also require expensive cooling devices.

It is also known to use plate-shaped components made of CFC-materials (that is, carbon-fiber-reinforced carbon composites) in space travel, such as disclosed in European Patent Document EP 0 359 614 A1 and German Patent Document DE 39 33 039 A1. The plate-shaped components according to German Patent Document DE 39 33 039 A1 are manufactured by a process in which prepregs, which may be made by using short fibers, are compressed in a heated press to form a plate-shaped molded body, and the resin binding agent is then carbonized while oxygen is excluded. The CFC-blank manufactured in this manner is infiltrated with pyrolytic carbon by means of a gas phase precipitation until it has a density of at least 1.2 g/cm$^3$. As a result, the carbon fibers are coated with a sufficiently thick layer of graphite in order to increase their oxidation stability. In order to further increase their oxidation stability, according to the German Patent Document DE 39 33 039 A1, a ceramic layer is also produced in the CFC-material.

Thus, metallic silicon is infiltrated in the molten state and is then reacted with the pyrolytic carbon to form silicon carbide. For this purpose, it is considered necessary for the CFC-material to have a high proportion of pyrolytic carbon so that, as the result of a correspondingly high availability of pyrolytic carbon, a rate of conversion of the silicon into silicon carbide is maximized. The remaining low quantity of metallic silicon is removed by reaction with nitrogen to form silicon nitride or with oxygen to form silicon oxide.

Although the CFC-material obtained in this manner provides a high oxidation stability, it has only a low stability with respect to temperature changes.

It has also been tried to manufacture hollow bodies for space travel, such as the thrust and control nozzles for power units, according to the filament winding technique in which fibers saturated with the resin binder are wound onto a winding spindle. However in the case of hollow bodies with a complex geometry, cracks and deformations occur as a result of contractions and other processes during the subsequent carbonizing of the resin binder of the wound body.

German Patent Document DE 34 26 911 A1 discloses a process for manufacturing oxidation-stable components for space travel, such as gas turbine engines, in which the CFC-component is provided with a silicon carbide layer by embedding into silicon carbide powder, and then with a silicon nitride layer by means of chemical gas phase precipitation. However, since the ceramic SiC- and $Si_3N_4$-oxidation protection layers on the surface of the component have a different coefficient of thermal expansion than CFC, crack formations will rapidly occur under the high stress caused by temperature changes, and oxygen diffusion into the CFC-substrate will occur after a short time. As a result, the carbon fibers will burn off, and the corresponding component will fail.

It is an object of the present invention to provide a simple and cost-effective process for the manufacture of components with complicated shapes, such as hollow bodies, on a CFC-base, which bodies can withstand extreme stress caused by temperature changes and at the same time have a high chemical stability (particularly an oxidation stability), and a resistance to wear as well as a high surface quality.

These and other objects and advantages are achieved by the process according to the invention, in which a solid body, having a density of no more than 0.8 g/cm$^3$ (preferably 0.1 to 0.6 g/cm$^3$) and thus a high porosity, is first manufactured from a CFC-material, in the shape of a block or a solid cylinder having no hollow spaces apart from the pores. In the manufacturing process, carbon (preferably graphite) fibers having a length of 1 to 50 mm (preferably 2 to 20 mm) are suspended in a thermosettable resin binder, which is dispersed in a solvent and is therefore particularly dissolved, in the amount of preferably 5 to 10 percent by weight. The suspension is then filled into a mold and the solvent is removed, for example by heating and/or by a subjecting it to a vacuum, and the resin binder in the mold (and thus the solid body) is hardened. It is then subjected in a vacuum to a temperature of, for example, 900° to 1,300° C. in order to carbonize the binder resin. In the carbonized C-matrix, the short fibers are therefore situated in a statistically distributed manner, completely unoriented. For this reason, and because only short fibers are used, an isotropic homogeneous material action is achieved. Such CFC-materials containing short fibers are also called CBCF (=Carbon Bonded Carbon Fiber).

The solid body is then preferably heated to a temperature of more than 2,000° C. in a vacuum atmosphere or controlled atmosphere in order to carry out a graphitization of the C-matrix.

By means of material cutting, the corresponding CFC-blank, having the measurements of the component to be produced (for example, the nozzle of a rocket engine) is then made from the solid body. The material cutting may be performed, for example, by turning, milling or grinding, using known machines for cutting metallic materials. The blank which, like the solid body, has a low density of from 0.1 to 0.8 g/cm$^3$ and thus a high porosity of up to 80 percent by volume, is then infiltrated with pyrolytic carbon by means of a chemical gas phase precipitation (CVD), to a density of from 0.6 to 1.0 g/cm$^3$. The density of 1.0 g/cm$^3$ must not be exceeded because otherwise the required porosity of from 10 to 70 percent by volume (preferably 20 to 50 percent by volume), required for subsequently infiltrating a sufficient amount of metallic silicon, will not be ensured. The chemical gas phase precipitation of the carbon is preferably carried out by means of a mixture of a hydrocarbon, such as methane, and an inert carrier gas, such as nitrogen, at a temperature of between 800° and 1,200° C. at a pressure of from 1 to 10 millibar.

Pyrolytic carbon is preferably precipitated on the surfaces of the short fibers, or on the fiber crossing points (which it surrounds), so that an increase of stability is achieved. In addition, the pyrolytic carbon is used as a carbon supplier for the subsequent silicon carbide formation.

After infiltration of the blank with pyrolytic carbon, the blank is infiltrated with such an amount of molten metallic silicon that its density amounts to at least 1.8 (preferably more than 2 g/cm$^3$). For this purpose, the lower end of the blank is dipped into liquid silicon, for example, in a high-temperature vacuum chamber. Because of the capillary forces inherent in the porous blank, the molten silicon is sucked upward in the blank, in a manner similar to that of a wick.

Subsequently, the temperature is increased to from 1,600° to 2,200° C., so that a portion of the metallic silicon in the blank is converted by means of the pyrolytic carbon precipitated on the fibers, to form oxidation-stable silicon carbide. However, the proportion of metallic silicon contained in the blank after the conversion must still amount to 15 to 40 percent (by weight) of the blank.

The component in this manner may then be subjected to an aftertreatment; for example, in the case of a rocket engine nozzle, in order to reduce the flow resistance of the hot combustion gases at the boundary layer. For such aftertreatment, known tools for cutting metals, particularly diamond tools, may be used.

Components manufactured by the process according to the invention have a high content of at least 15 percent, preferably at least 30 percent (by weight), of metallic silicon; in this case, elementary silicon.

Surprisingly, it was found that, despite the high proportion of metallic silicon (which is not converted to a silicon carbide), components on the CFC-base manufactured according to the invention have a high stability with respect to temperature changes and oxidation. This result is surprising because the components according to the invention are subjected to temperatures far above the melting point of metallic silicon of 1,412° C. During solidification following such heating, silicon expands considerably, resulting in stress to the composite material caused by temperature changes. That is, when the silicon melts and solidifies again, cracks and delaminations would be expected at the boundary surface between the metallic silicon and the other carbon and silicon carbide components of the composite material which permit penetration of oxygen into the material, burning-off of the reinforcing fibers and similar problems. In addition, metallic silicon is a particularly brittle material. Thus, with a high proportion of metallic silicon in CFC-components manufactured according to the invention, it might be expected that as a result of their brittleness, such components will tend to form cracks, break and the like.

Such expected negative characteristics of a high proportion of metallic silicon do not occur in the component manufactured according to the invention, however, because the metallic silicon forms a viscous melting in the pores of the component if, as provided according to the invention, it is subjected to temperatures of 1,500° C. and more. Incipient cracks, which start to develop in the composite material at a high temperature, therefore enter into the melting phase, whereby the crack energy is absorbed so that the cracks, which are in the process of being formed, are repaired immediately.

So that, during stress because of temperature changes, the metallic silicon can melt and solidify again while the volume increases, a corresponding free pore volume must be ensured in the component. This means that for components manufactured according to the invention, although the metallic silicon takes up essentially the whole pore volume (preferably more than 80 percent, and particularly more than 90% by volume), a residual volume of preferably at least 5 percent must remain free.

In addition to preventing critical cracks which might otherwise form as a result of the high proportion of metallic silicon, the process according to the invention, also increases the oxidation stability of such components due to the reaction of the metallic silicon to form silicon oxide when the component is used in an oxidative environment. This process provides an additional protective layer against further oxidation.

It was also found that, due to the high silicon content (and resultant high density), the component according to the invention can be subjected to a perfect surface treatment in order to achieve the required high surface quality. Such surface treatment may be carried out by means of conventional tooling machines.

The content of metallic silicon in the component according to the invention must be between 15 and 40% by weight. That is, a metallic silicon content of less than 15 percent by weight causes the component according to the invention to tend to have the characteristics of ceramic components, and in particular, a tendency to suffer from brittle fractures. In the case of metallic silicon contents of above 40 percent by weight, because of the massive volume expansion of the metallic silicon during the solidification, there may be a destruction of the components.

Components manufactured according to the invention are intended mainly for space travel. Apart from their complicated geometry (for example, hollow bodies), such components must withstand high stress caused by temperature changes and must have a high oxidation stability. In addition to antennas, reflectors, thermal shields, linings for rocket combustion chambers and expansion nozzles of any geometry, size and thrust, the process according to the invention is particularly suitable for manufacturing the nozzles of vernier engines for the control of the satellite orbiting position as well as for manufacturing the lining of the gas conducting manifold for the ignition of rocket engines. These components are subjected cyclically, in milliseconds to second intervals, to temperature changes of 2,000° C. and more with a simultaneous abrasive wear by the combustion gases. Despite these extreme conditions, particularly with respect to nozzles for engines that control satellite orbits, a useful life of many years is required.

Other objects, advantages and novel features of the present invention will become apparent from the following detailed description of the invention when considered in conjunction with the accompanying drawings.

DETAILED DESCRIPTION OF THE DRAWINGS

Figure 1:
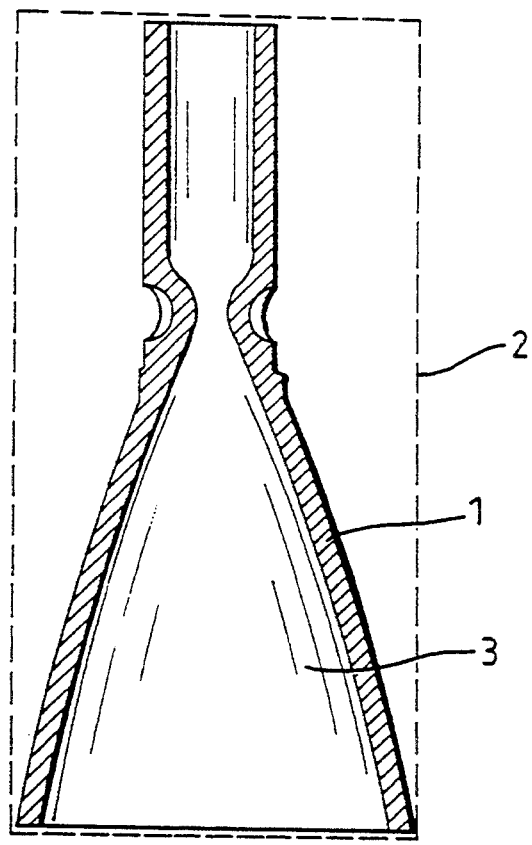
FIG. 1 is a sectional view of the combustion chamber with the expansion nozzle of a rocket engine for the control of the satellite orbiting position.

The nozzle according to FIG. 1 is produced from a solid CFC-body (shown in the drawing by an interrupted line) having a density of from 0.1 to 0.8 g/cm$^3$, and a high porosity. The nozzle is shaped from the CFC-body by milling-out the hollow space 3 and by cutting the material on the exterior side. The solid body 2 may be a block or a solid cylinder.

Figure 2:
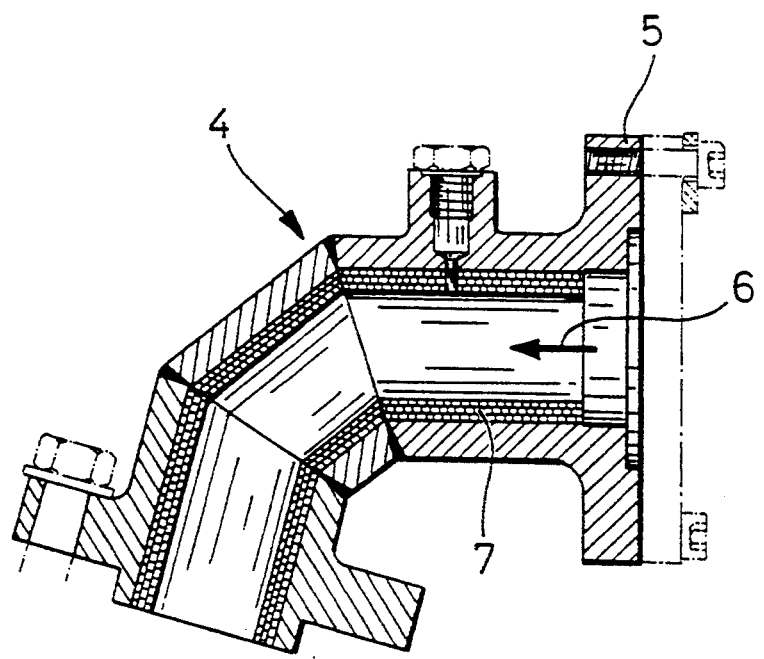
FIG. 2 is a sectional view of a gas conducting manifold for ignition of rocket engines.

According to FIG. 2, a tube-shaped gas conducting manifold 4 is connected by means of its flange 5 to a rocket engine which is not shown. Corresponding to arrow 6, the hot combustion gases of a solid propellant flow into the engine through the gas conducting manifold 4 in order to ignite the engine. On the inside, the gas conducting manifold 4 is provided with a lining 7 which is made of the material manufactured according to the invention.

The following example is used for a further explanation of the invention.

EXAMPLE

Short fibers on a graphite base, having a length of from 3 to 10 mm, are reduced to a slurry in a phenolic resin suspension. The fiber content in the suspension may amount to from 5 to 60 percent by weight. The suspension is filled into a mold, and the solvent of the phenolic resin is removed by suction at 70° C. When the temperature is further increased to 150° C., the phenolic resin is plasticized. The solid body, for example, a block, obtained after removal from the mold is carbonized in a reactor at approximately 1,000° C. while oxygen is excluded, that is, in a vacuum or in a controlled atmosphere. The resulting solid CFC-body with an isotropic structure has a porosity of approximately 80 percent by volume. In order to minimize the reactivity of the carbon fibers with oxygen, the solid body is subjected to a temperature of more than 2,000° C. while oxygen is again excluded, that is, in a vacuum or in a controlled atmosphere, so that the matrix carbon formed by carbonizing the phenolic resin is at least partially graphitized. The solid body has a density of 0.4 g/cm$^3$.

The blank for the combustion chamber of an engine for the control of the satellite position shown in FIG. 1 is then produced mechanically from the solid body by means of turning, milling and/or grinding.

The blank is infiltrated with pyrolytic carbon in a reactor for 100 hours at 950° C. and at a partial pressure of 5 millibar using methane and nitrogen at a ratio of 1:3 by means of chemical gas phase precipitation until its density amounts to 0.75 g/cm$^3$ and its open porosity has decreased to approximately 40%. Thereafter the blank is placed in a high-temperature vacuum chamber whose bottom is covered with molten metallic silicon, which rises in the blank as a result of the capillary forces, until the pores are almost completely filled with metallic silicon. The blank is then heated to a temperature of approximately 2,000° C. within 3 hours in the high-temperature vacuum chamber, so that a portion of the metallic silicon is reacted with pyrolytic carbon to form silicon carbide. After being cooled to room temperature, the component has a density of 2.1 g/cm$^3$. The content of metallic silicon of the component amounts to 34%. The combustion chamber thus obtained is also subjected to a surface aftertreatment.

The combustion chamber was subjected to a hot-temperature test which was carried out with a mixture of nitrogen tetroxide and monomethyl hydrazine. The burning period was 1,000 secs. The weight loss of the combustion chamber amounted to 3%. Delaminations and crack formations could not be detected. A light SiO$_2$ passivation layer was found on the component surface. The 3% weight loss should be the result of a diffusion of the metallic silicon.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A process for manufacturing an oxidation stable component for use in space travel and in temperature environment of at least 1500° C. from a solid CFC-body, comprising the steps of:

preparing a solid CFC-body with a density of from 0.1 to 0.6 g/cm$^3$ from short carbon fibers in an amount of from 5 to 60 percent by weight suspension in a hardenable resin binder, by filling the suspension into a mold corresponding to a shape of the solid CFC-body, removing the solvent from the suspension, and thermosetting and carbonizing the resin binder;

machining said solid CFC-body to a desired shape and dimensions of said component to produce a CFC-blank;

infiltrating said CFC-blank with pyrolyric carbon to a density of no more than 1.0 g/cm$^3$; and infiltrating said CFC-blank, previously infiltrated by a pyrolyric carbon, with an amount of molten silicon which brings its density to more than 1.8 g/cm$^3$ heating said CFC-blank to temperature within a range of from 1,600° to 2,200° C. whereby a portion of said metallic silicon reacts with said pyrolyric carbon to form silicon carbide and the unreacted metallic silicon in said component comprises 25 to 40 percent by weight of the component.

2. A process according to claim 1, wherein the short carbon fibers have a length of from 1 to 50 mm.

3. A process according to claim 1, wherein after the carbonization of the resin binder, the solid CFC-body is subjected to a temperature of at least 2,000° C. for graphitizing.

4. A process according to claim 1, wherein a phenolic resin is used as the resin binder.

5. A process according to claim 3, wherein a phenolic resin is used as the resin binder.

6. A process according to claim 1, wherein graphite fibers are used as short carbon fibers.

7. A process according to claim 4, wherein graphite fibers are used as short carbon fibers.

8. A process according to claim 1, wherein the machining of the solid CFC-body into the CFC-blank is performed by at least one process selected from the group consisting of turning, milling and grinding.

9. A process according to claim 1, wherein the CFC-blank is infiltrated with pyrolytic carbon to a density of from 0.6 to 0.9 g/cm$^3$.

10. A process according to claim 3; wherein the CFC-blank is infiltrated with pyrolytic carbon to a density of from 0.6 to 0.9 g/cm$^3$.

11. A process according to claim 1, wherein the CFC-blank is infiltrated with the pyrolytic carbon until a free pore volume of the CFC-blank of 10 to 70 percent by volume remains.

12. A process according to claim 9, wherein the CFC-blank is infiltrated with the pyrolytic carbon until a free pore volume of the CFC-blank of 10 to 70 percent by volume remains.

13. A process according to claim 1, wherein the infiltrating of the blank with the pyrolytic carbon takes place by means of chemical gas phase precipitation.

14. A process according to claim 9, wherein the infiltrating of the blank with the pyrolytic carbon takes place by means of chemical gas phase precipitation.

15. A process according to claim 14, wherein the chemical gas phase precipitation takes place by means of a mixture of a hydrocarbon and an inert carrier gas at a temperature of between 800° and 1,200° C. and a pressure of from 1 to 100 millibar.

16. A process according to claim 1, wherein the CFC-blank is infiltrated with such a quantity of molten silicon that its density amounts to more than 2 g/cm$^3$.

17. A process according to claim 16, wherein for the infiltrating with the molten silicon, the CFC-blank is placed with its lower end in molten silicon, the molten silicon rising in the blank as a result of the capillary forces of the blank.

18. A process according to claim 1, wherein said component is a hollow body.

19. A process according to claim 18, wherein said component is selected from the group consisting of a combustion chamber of an engine for controlling the position of satellites, nozzle of an engine for controlling the position of satellites, and a gas conducting manifold for ignition of a rocket engine.

* * * * *